US012615612B2

(12) United States Patent
Feng et al.

(10) Patent No.: US 12,615,612 B2
(45) Date of Patent: Apr. 28, 2026

(54) USER EQUIPMENT POSITIONING METHOD, APPARATUS, BASE STATION AND STORAGE MEDIUM

(71) Applicant: BEIJING UNIVERSITY OF POSTS AND TELECOMMUNICATIONS, Beijing (CN)

(72) Inventors: Zhiyong Feng, Beijing (CN); Xu Chen, Beijing (CN); Ping Zhang, Beijing (CN); Zhiqing Wei, Beijing (CN); Qixun Zhang, Beijing (CN); Sai Huang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 337 days.

(21) Appl. No.: 18/481,078

(22) Filed: Oct. 4, 2023

(65) Prior Publication Data

US 2025/0008467 A1      Jan. 2, 2025

(30) Foreign Application Priority Data

Jun. 28, 2023    (CN) .......................... 202310778328.5

(51) Int. Cl.
*H04W 64/00*        (2009.01)
*H04L 5/00*         (2006.01)

(52) U.S. Cl.
CPC .......... *H04W 64/00* (2013.01); *H04L 5/0057* (2013.01)

(58) Field of Classification Search
CPC ... H04W 64/00; H04W 64/003; H04W 88/08; H04L 5/0057; Y02D 30/70; H04B 7/0617; H04B 7/0626
See application file for complete search history.

(56) References Cited

U.S. PATENT DOCUMENTS

| | | | |
|---|---|---|---|
| 10,998,945 B1 * | 5/2021 | Baligh | B25J 9/0093 |
| 11,385,315 B2 * | 7/2022 | Chae | G01S 5/0247 |

(Continued)

*Primary Examiner* — Dhaval V Patel
(74) *Attorney, Agent, or Firm* — NORTON ROSE FULBRIGHT US LLP

(57) ABSTRACT

The embodiments of the present invention provide a user equipment positioning method, apparatus, a base station and a storage medium, and relates to the technical field of wireless communication. The method is applied to a base station and comprises: receiving a pilot signal sent by a target UE; calculating a CSI estimation value of a channel between the base station and the target UE according to the received pilot signal; calculating transmission directions of the pilot signal along different signal paths according to the CSI estimation value to obtain AoA estimation values; performing directional beamforming based on the AoA estimation values to generate a spatially filtered CSI estimation value; performing Kalman filtering on the spatially filtered CSI estimation value to generate an enhanced CSI estimation value; calculating transmission distances of the pilot signal transmitted along different signal path according to the enhanced CSI estimation value to obtain distance estimation values; determining a position of the target UE according to a minimum distance estimation value among the distance estimation values and an AoA estimation value corresponding to the minimum distance estimation value. The solutions provided by the embodiments of the present invention can improve the accuracy of UE positioning.

14 Claims, 6 Drawing Sheets

(56) References Cited

U.S. PATENT DOCUMENTS

| | | | |
|---|---|---|---|
| 12,117,547 B2 * | 10/2024 | Duan | G01S 5/021 |
| 12,119,903 B2 * | 10/2024 | Hadani | H04W 52/143 |
| 2025/0287183 A1 * | 9/2025 | Gummadi | H04W 4/021 |

\* cited by examiner

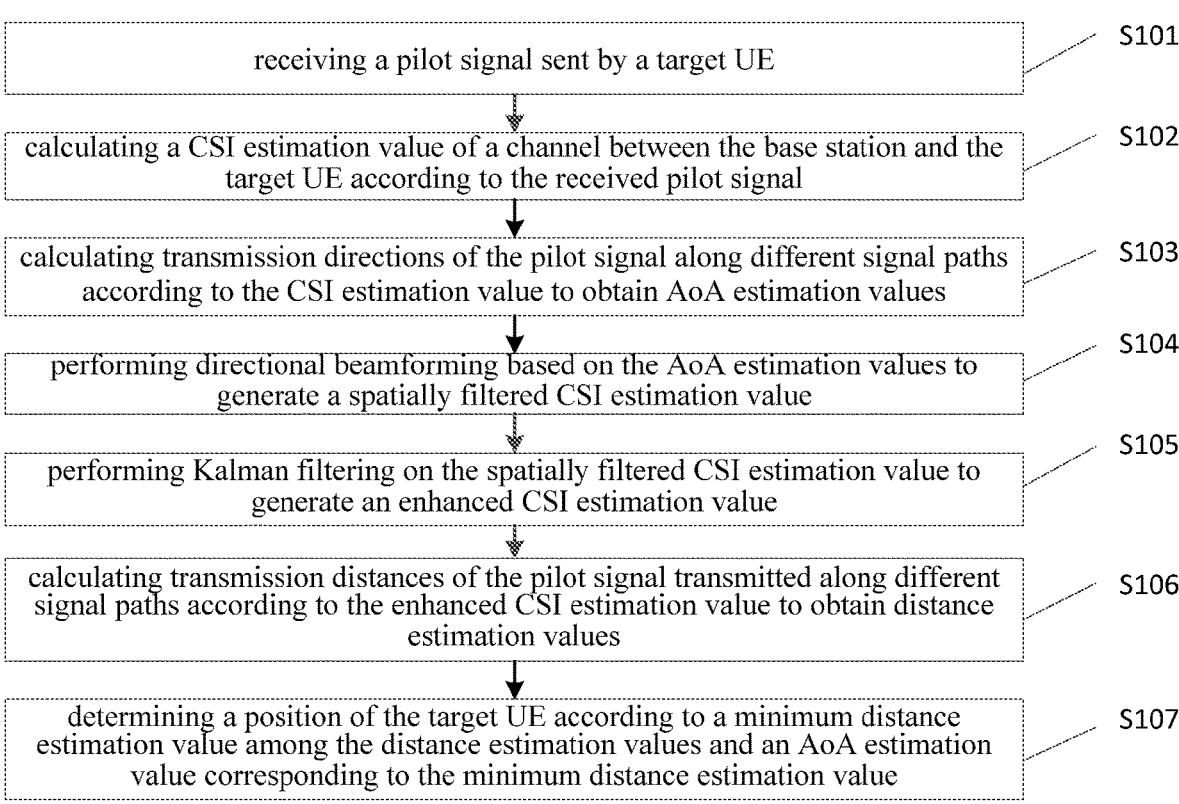

receiving a pilot signal sent by a target UE — S101 calculating a CSI estimation value of a channel between the base station and the target UE according to the received pilot signal — S102 calculating transmission directions of the pilot signal along different signal paths according to the CSI estimation value to obtain AoA estimation values — S103 performing directional beamforming based on the AoA estimation values to generate a spatially filtered CSI estimation value — S104 performing Kalman filtering on the spatially filtered CSI estimation value to generate an enhanced CSI estimation value — S105 calculating transmission distances of the pilot signal transmitted along different signal paths according to the enhanced CSI estimation value to obtain distance estimation values — S106 determining a position of the target UE according to a minimum distance estimation value among the distance estimation values and an AoA estimation value corresponding to the minimum distance estimation value — S107

Fig. 1

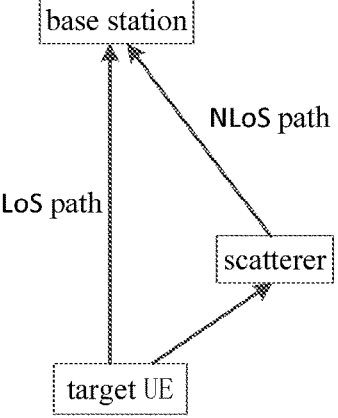

base station

NLoS path

LoS path scatterer target UE

Fig. 2 calculating a Doppler frequency shift estimation value and a noise variance
estimation value according to the spatial filtered CSI estimation value          S1051 generating a state transition coefficient according to the Doppler frequency shift
estimation value          S1052 generating a state transition equation according to the state transition coefficient          S1053 performing Kalman filtering on the spatially filtered CSI estimation value
according to the state transition equation and the noise variance estimation value
to generate the enhanced CSI estimation value          S1054

Fig. 3-1

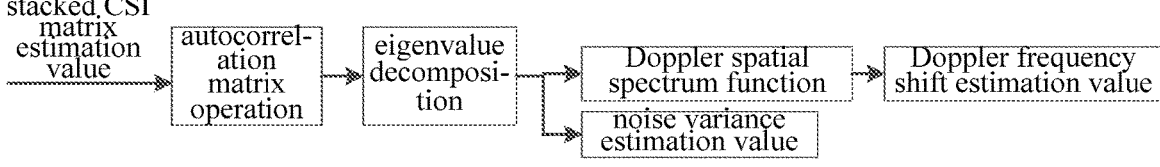

stacked CSI
matrix
estimation
value  →  autocorrel-
ation
matrix
operation  →  eigenvalue
decomposi-
tion  →  Doppler spatial
spectrum function  →  Doppler frequency
shift estimation value
→  noise variance
estimation value

Fig. 3-2

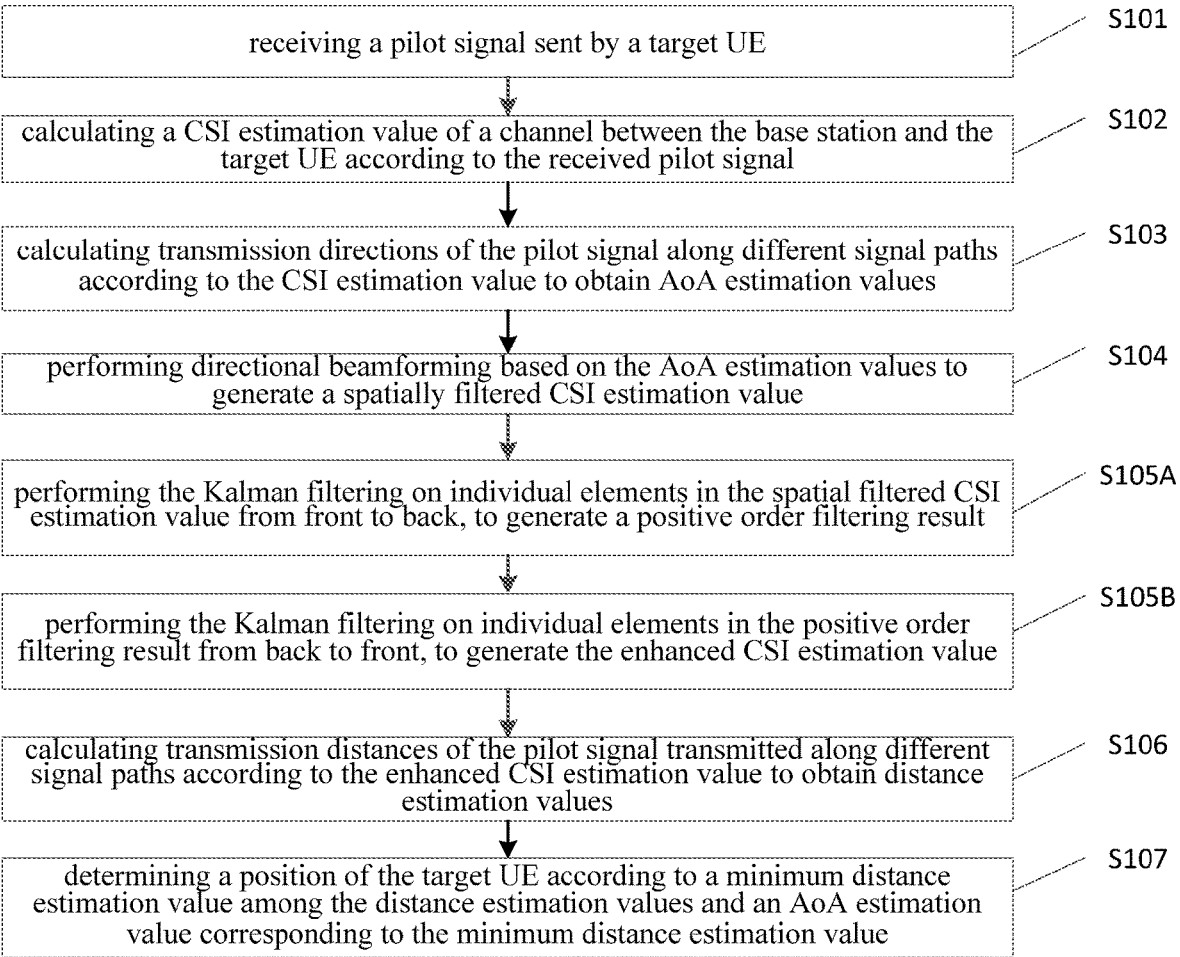

receiving a pilot signal sent by a target UE     S101 calculating a CSI estimation value of a channel between the base station and the target UE according to the received pilot signal     S102 calculating transmission directions of the pilot signal along different signal paths according to the CSI estimation value to obtain AoA estimation values     S103 performing directional beamforming based on the AoA estimation values to generate a spatially filtered CSI estimation value     S104 performing the Kalman filtering on individual elements in the spatial filtered CSI estimation value from front to back, to generate a positive order filtering result     S105A performing the Kalman filtering on individual elements in the positive order filtering result from back to front, to generate the enhanced CSI estimation value     S105B calculating transmission distances of the pilot signal transmitted along different signal paths according to the enhanced CSI estimation value to obtain distance estimation values     S106 determining a position of the target UE according to a minimum distance estimation value among the distance estimation values and an AoA estimation value corresponding to the minimum distance estimation value     S107

Fig. 4-1

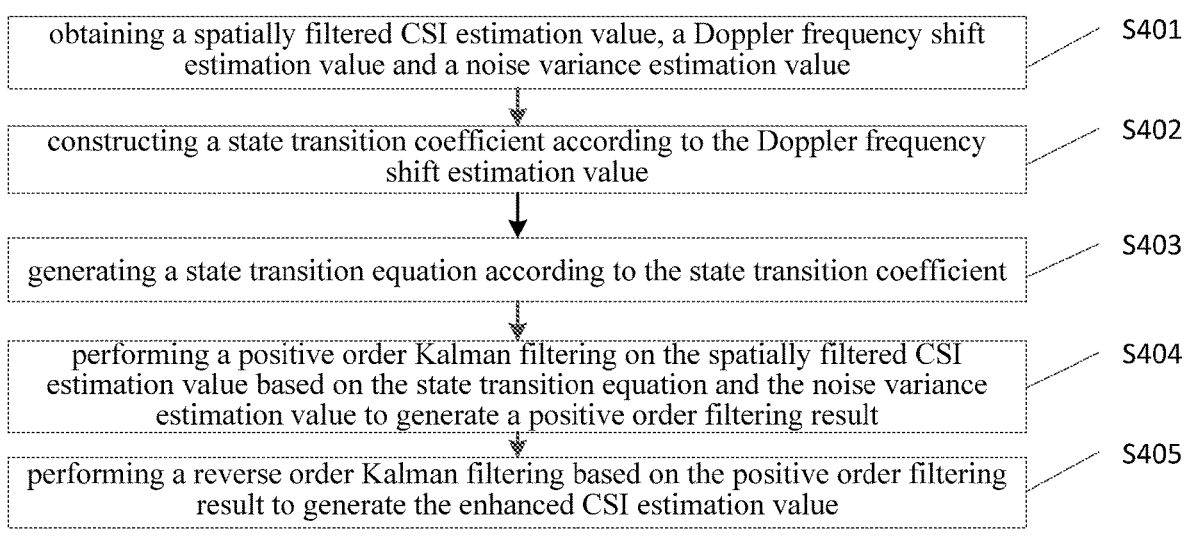

obtaining a spatially filtered CSI estimation value, a Doppler frequency shift estimation value and a noise variance estimation value — S401 constructing a state transition coefficient according to the Doppler frequency shift estimation value — S402 generating a state transition equation according to the state transition coefficient — S403 performing a positive order Kalman filtering on the spatially filtered CSI estimation value based on the state transition equation and the noise variance estimation value to generate a positive order filtering result — S404 performing a reverse order Kalman filtering based on the positive order filtering result to generate the enhanced CSI estimation value — S405

Fig. 4-2

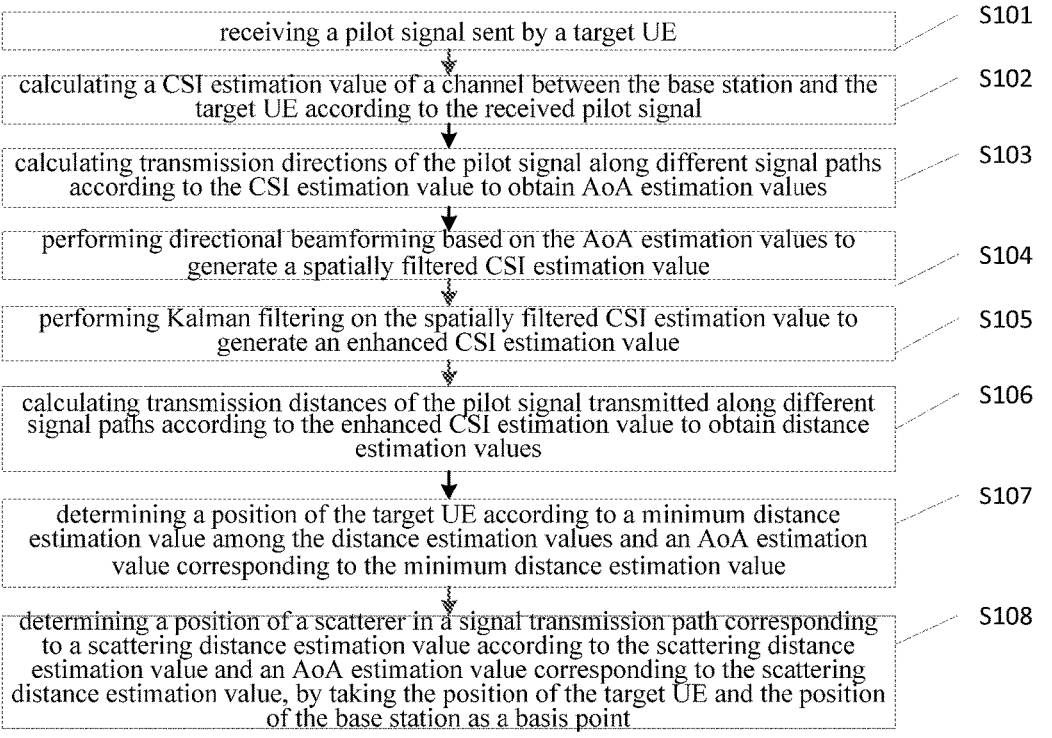

receiving a pilot signal sent by a target UE — S101 calculating a CSI estimation value of a channel between the base station and the target UE according to the received pilot signal — S102 calculating transmission directions of the pilot signal along different signal paths according to the CSI estimation value to obtain AoA estimation values — S103 performing directional beamforming based on the AoA estimation values to generate a spatially filtered CSI estimation value — S104 performing Kalman filtering on the spatially filtered CSI estimation value to generate an enhanced CSI estimation value — S105 calculating transmission distances of the pilot signal transmitted along different signal paths according to the enhanced CSI estimation value to obtain distance estimation values — S106 determining a position of the target UE according to a minimum distance estimation value among the distance estimation values and an AoA estimation value corresponding to the minimum distance estimation value — S107 determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point — S108

Fig. 5-1

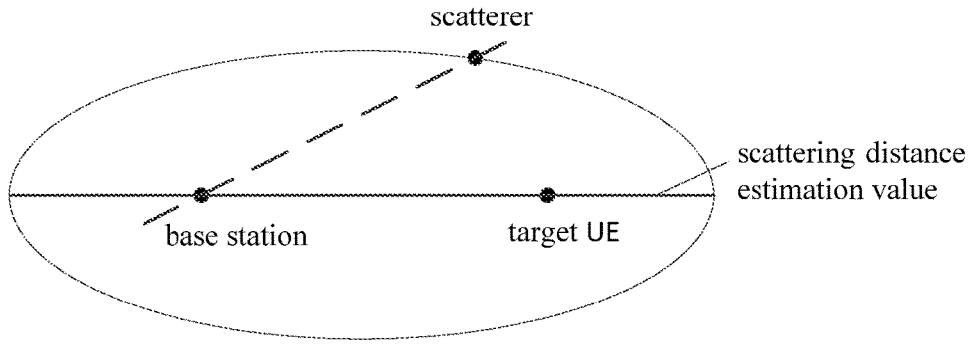

Fig. 5-2

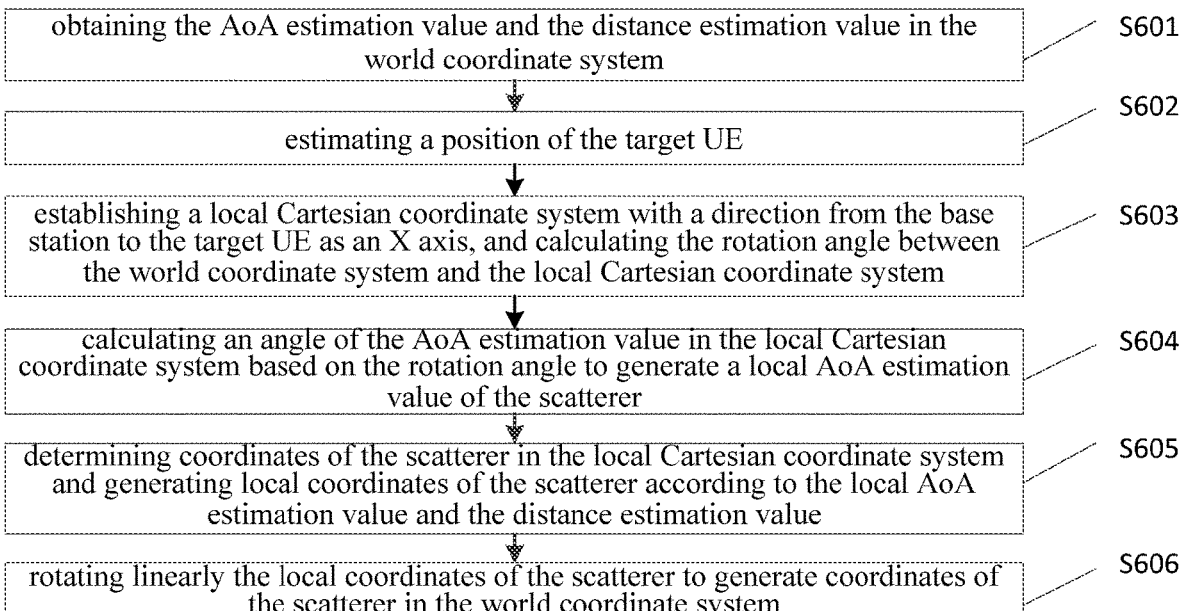

| | |
|---|---|
| obtaining the AoA estimation value and the distance estimation value in the world coordinate system | S601 |
| estimating a position of the target UE | S602 |
| establishing a local Cartesian coordinate system with a direction from the base station to the target UE as an X axis, and calculating the rotation angle between the world coordinate system and the local Cartesian coordinate system | S603 |
| calculating an angle of the AoA estimation value in the local Cartesian coordinate system based on the rotation angle to generate a local AoA estimation value of the scatterer | S604 |
| determining coordinates of the scatterer in the local Cartesian coordinate system and generating local coordinates of the scatterer according to the local AoA estimation value and the distance estimation value | S605 |
| rotating linearly the local coordinates of the scatterer to generate coordinates of the scatterer in the world coordinate system | S606 |

Fig. 6

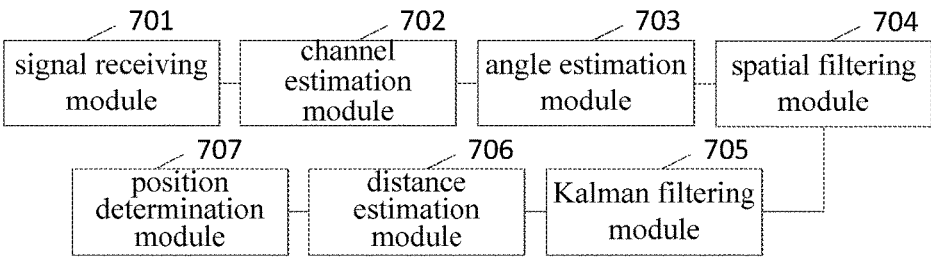

Fig. 7

USER EQUIPMENT POSITIONING METHOD, APPARATUS, BASE STATION AND STORAGE MEDIUM

CROSS-REFERENCE TO RELATED APPLICATIONS

The present application claims the benefit of priority to Chinese Patent Application No. 202310778328.5, filed Jun. 28, 2023, the entire contents of which are hereby incorporated by reference in their entirety.

TECHNICAL FIELD

The present application relates to the technical field of wireless communication, in particular to a user equipment positioning method, a user equipment positioning apparatus, a base station and a storage medium.

BACKGROUND

In the field of wireless communication, a base station needs to position a UE (User Equipment) and transmit data according to the position of the UE to realize normal communication there between.

In the related art, GPS (Global Position System) is usually used to position the UE, but it takes some time for GPS to transmit the positioning results of UE to the base station. If the UE is in a moving state, the position of the UE may have changed when the base station receives the positioning results of the UE, resulting in inaccurate positioning results of the UE received by the base station.

SUMMARY

The embodiments of the present invention aim to provide a user equipment positioning method, a user equipment positioning apparatus, a base station and a storage medium, so as to improve the accuracy of UE positioning. The specific technical solutions are as follows:

In a first aspect, an embodiment of the present invention provides a user equipment positioning method, applied to a base station, wherein the method comprises:

receiving a pilot signal sent by a target user equipment, UE;

calculating a channel state information, CSI, estimation value of a channel between the base station and the target UE according to the received pilot signal;

calculating transmission directions of the pilot signal along different signal paths according to the CSI estimation value to obtain angle of arrival, AoA, estimation values;

performing directional beamforming based on the AoA estimation values to generate a spatially filtered CSI estimation value;

performing Kalman filtering on the spatially filtered CSI estimation value to generate an enhanced CSI estimation value;

calculating transmission distances of the pilot signal transmitted along different signal paths according to the enhanced CSI estimation value to obtain distance estimation values;

determining a position of the target UE according to a minimum distance estimation value among the distance estimation values and an AoA estimation value corresponding to the minimum distance estimation value.

In an embodiment of the present invention, the performing Kalman filtering on the spatially filtered CSI estimation value to generate an enhanced CSI estimation value, comprises:

performing the Kalman filtering on individual elements in the spatial filtered CSI estimation value from front to back, to generate a positive order filtering result;

performing the Kalman filtering on individual elements in the positive order filtering result from back to front, to generate the enhanced CSI estimation value.

In an embodiment of the present invention, the performing Kalman filtering on the spatially filtered CSI estimation value to generate an enhanced CSI estimation value, comprises:

calculating a Doppler frequency shift estimation value and a noise variance estimation value according to the spatial filtered CSI estimation value;

generating a state transition coefficient according to the Doppler frequency shift estimation value;

generating a state transition equation according to the state transition coefficient;

performing the Kalman filtering on the spatially filtered CSI estimation value according to the state transition equation and the noise variance estimation value to generate the enhanced CSI estimation value.

In an embodiment of the present invention, the method further includes:

determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

In a second aspect, an embodiment of the present invention provides a user equipment positioning apparatus, applied to a base station, wherein the apparatus comprises:

a signal receiving module, configured for receiving a pilot signal sent by a target user equipment, UE;

a channel estimation module, configured for calculating a channel state information, CSI, estimation value of a channel between the base station and the target UE according to the received pilot signal;

an angle estimation module, configured for calculating transmission directions of the pilot signal along different signal paths according to the CSI estimation value to obtain angle of arrival, AoA, estimation values;

a spatial filtering module, configured for performing directional beamforming based on the AoA estimation values to generate a spatially filtered CSI estimation value;

a Kalman filtering module, configured for performing Kalman filtering on the spatially filtered CSI estimation value to generate an enhanced CSI estimation value;

a distance estimation module, configured for calculating transmission distances of the pilot signal transmitted along different signal paths according to the enhanced CSI estimation value to obtain distance estimation values;

a position determination module, configured for determining a position of the target UE according to a minimum distance estimation value among the distance estimation values and an AoA estimation value corresponding to the minimum distance estimation value.

In an embodiment of the present invention, the Kalman filtering module includes:

a positive order filtering submodule, configured for performing the Kalman filtering on individual elements in the spatial filtered CSI estimation value from front to back, to generate a positive order filtering result;

a reverse order filtering submodule, configured for performing the Kalman filtering on individual elements in the positive order filtering result from back to front, to generate the enhanced CSI estimation value.

In an embodiment of the present invention, the Kalman filtering module includes:

an estimation value calculation submodule, configured for calculating a Doppler frequency shift estimation value and a noise variance estimation value according to the spatial filtered CSI estimation value;

a coefficient generating submodule, configured for generating a state transition coefficient according to the Doppler frequency shift estimation value;

an equation generation submodule, configured for generating a state transition equation according to the state transition coefficient;

a Kalman filtering submodule, configured for performing the Kalman filtering on the spatially filtered CSI estimation value according to the state transition equation and the noise variance estimation value to generate the enhanced CSI estimation value.

In an embodiment of the present invention, the apparatus further includes:

a scatterer position determination module, configured for determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

In a third aspect, an embodiment of the present invention provides a base station comprising a processor, a communication interface, a memory and a communication bus, wherein the processor, the communication interface and the memory communicate with each other through the communication bus; wherein the memory is to store a computer program;

the processor is to implement any of the above user equipment positioning methods when executing the program stored in the memory.

In a fourth aspect, an embodiment of the present invention provides a computer-readable storage medium having a computer program stored thereon which, when executed by a processor, realizes any one of steps of the above user equipment positioning methods.

In a fifth aspect, an embodiment of the present invention also provides a computer program product which contains instructions which, when run on a computer, cause the computer to perform any one of the above user equipment positioning methods.

The embodiments of the present invention have the following beneficial effects that:

According to the user equipment positioning method provided by an embodiment of the present invention, the position of the UE is directly calculated by the base station according to the pilot signal sent by the UE, without the need to send positioning results of the UE through GPS, this avoids the problem of deviation of the positioning results of the UE caused by the change of the position of the UE in the process of GPS sending the UE positioning results to the base station, thus improving the accuracy of the positioning of the UE.

Furthermore, by performing Kalman filtering on the spatially filtered CSI estimation value, the distance offset caused by the time offset in the spatially filtered CSI estimation value can be suppressed, and an enhanced CSI estimation value which is not affected by time offset can be generated, so that the UE can be positioned based on the enhanced CSI estimation value which is not affected by the time offset, thereby making the determined position of the UE more accurate.

Of course, it is not necessary to achieve all the advantages mentioned above at the same time to implement any product or method of the present invention.

BRIEF DESCRIPTION OF THE DRAWINGS

In order to explain the embodiments of the present invention or the technical solutions in the prior art more clearly, the drawings needed in the description of the embodiments or the prior art will be briefly introduced below. Obviously, the drawings in the following description are only some embodiments of the present invention, and other embodiments can be obtained according to these drawings for those skilled in the art.

FIG. 1 is a schematic flowchart of a first user equipment positioning method provided by an embodiment of the present invention;

FIG. 2 is a schematic diagram of a path for sending a pilot signal provided by an embodiment of the present invention;

FIG. 3-1 is a schematic flowchart of a second user equipment positioning method provided by an embodiment of the present invention;

FIG. 3-2 is a schematic flowchart of calculating a Doppler frequency shift estimation value and a noise variance estimation value provided by an embodiment of the present invention;

FIG. 4-1 is a schematic flowchart of a third user equipment positioning method provided by an embodiment of the present invention;

FIG. 4-2 is a schematic flowchart of Kalman filtering provided by an embodiment of the present invention;

FIG. 5-1 is a schematic flowchart of a fourth user equipment positioning method provided by an embodiment of the present invention;

FIG. 5-2 is a schematic flowchart of determining the position of a scatterer by using an ellipsoid according to an embodiment of the present invention;

FIG. 6 is a schematic flowchart of determining the position of a target UE and the position of a scatterer provided by an embodiment of the present invention;

FIG. 7 is a schematic diagram of the structure of a user equipment positioning apparatus provided by an embodiment of the present invention;

DETAILED DESCRIPTION

Figure 8:
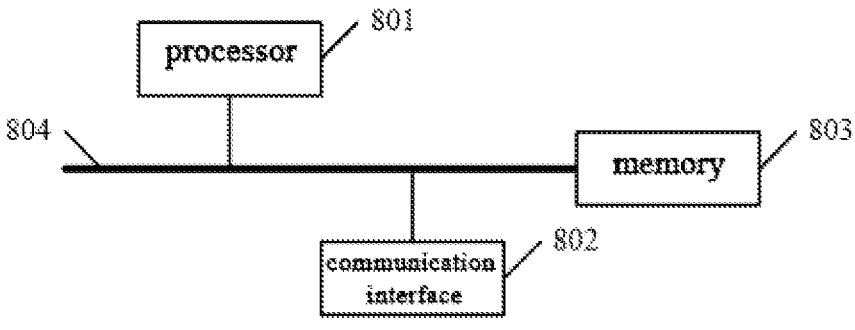
FIG. 8 is a schematic diagram of a structure of a base station provided by an embodiment of the present invention.

In the following, the technical solution in the embodiments of the present invention will be clearly and completely described with reference to the attached drawings. Obviously, the described embodiments are only a part, not all of the embodiments of the present invention. Based on offUS 12,615,612 B2

5 the embodiments in the present invention, all other embodiments obtained by one skilled in the art based on the present invention belong to the scope of protection of the present invention.

In order to improve the accuracy of UE positioning, embodiments of the present invention provide a user equipment positioning method, apparatus, base station and storage medium, which are described in detail below.

An embodiment of the present invention provides a user equipment positioning method, which is applied to a base station. Refer to FIG. 1, which is a schematic flowchart of a first user equipment positioning method provided by an embodiment of the present invention. The above method includes the following steps S101-S107.

S101, receiving a pilot signal sent by a target UE.

The pilot signal is a signal sent by the target UE to enable the base station to determine the position of the target UE.

In the process of sending the pilot signal by the target UE, the pilot signal can be transmitted through different signal paths. Refer to FIG. 2, which is a schematic diagram of a path for sending a pilot signal provided by an embodiment of the present invention. The path for the pilot signal may be a path that the target UE directly transmits the pilot signal to the base station, which corresponds to the LoS (Line-of-Sight) path in FIG. 2; or a path that the target UE transmits the pilot signal to the base station after being reflected by the scatterer, which corresponds to the NLOS (Non-Line-of-Sight) path in FIG. 2. Multiple such paths are adopted in actual situations, and for convenience of explanation, one path is taken herein as an example. Based on this, the target UE can be positioned by LoS path and the scatterer can be positioned by NLOS path.

S102, calculating a CSI (Channel State Information) estimation value of a channel between the base station and the target UE according to the received pilot signal.

Specifically, the channel estimation method in the related art can be used to calculate the CSI estimation value of the channel between the base station and the target UE according to the received pilot signal. The above channel estimation method can be a channel estimation method in related art, such as least square method, linear minimum mean square error method, compressed sensing method, etc.

In an example, the least square method is used to estimate the channel between the base station and the target UE to generate a CSI estimation value:

$$\hat{h}_{C,n,m} = \frac{y_{C,n,m}}{d_{n,m}} h_{C,n,m} + \overline{n}_{t,n,m} =$$

$$\sqrt{P_t^U} \sum_{l=0}^{L-1} \left[ b_{C,l} e^{-j2\pi m T_s \left[ f_{c,d,l} + \delta_f(m) \right]} e^{-j2\pi n \Delta f \left[ \tau_{c,l} + \delta_\tau(m) \right]} \chi_{TX,l} a\left( p_{RX,l}^U \right) \right] +$$

$$\overline{n}_{t,n,m} \in \mathbb{C}^{P_t Q_t \times 1},$$

wherein, C represents CSI, characterized by communication channel response, n represents an index number of a subcarrier, m represents an index number of a packet, and $\hat{h}_{c,n,m}$ represents a CSI estimation value on the n-th subcarrier of the m-th OFDM (orthogonal frequency division multiplexing) pilot symbol; $Y_{c,n,m}$ represents the received signal of the base station on the n-th subcarrier of the m-th OFDM pilot symbol; $d_{n,m}$ represents a symbol value on the n-th subcarrier of the m-th OFDM pilot symbol; $h_{c,n,m}$ represents a true frequency domain channel response from the sending array to the receiving array on the n-th subcarrier of the m-th OFDM pilot symbol;

$$\overline{n}_{t,n,m} = \frac{n_{t,n,m}}{d_{n,m}},$$

6 wherein t represents time, $\overline{n}_{t,n,m}$ represents the transformed noise term on the n-th subcarrier of the m-th OFDM pilot symbol at time t, and $n_{t,n,m}$ represents the original noise term on the n-th subcarrier of the m-th OFDM pilot symbol at time t; P represents power, U represents uplink transmission, and $$P_t^U$$

represents the sending power of uplink signal at time t; l represents an index number of channel multipath, l=0 means it corresponds to LoS path, l≈0 means it corresponds to the l-th NLOS path, and L represents the total number of signal paths; $b_{c,l}$ represents the channel gain of the l-th wireless communication channel path; j represents an imaginary unit; $T_s$ represents the time interval between two OFDM pilot symbols; $f_{c,d,l}$ represents the Doppler frequency shift of the l-th wireless communication channel path, wherein d represents a variable related to Doppler frequency shift; $\delta_f(m)$ represents CFO (Carrier Frequency Offset) under the m-th OFDM pilot symbol, wherein f represents a frequency-related variable; $\Delta f$ represents the subcarrier interval; $\Gamma_{c,l}$ represents the propagation delay of the l-th wireless communication channel path; $\delta_\tau(m)$ represents TO (Timing Offset) which changes with time under the m-th OFDM pilot symbol; TX represents the quantity related to the sending signal; $\chi_{TX,l}$ represents the sending BF (beamforming) gain on the l-th signal path; a represents an array steering vector; RX represents the quantity related to the receiving signal, and $$P_{RX,1}^U$$

represents the AoA of the l-th uplink signal path;

$$a\left( p_{RX,1}^U \right)$$

represents the uplink receiving steering vector under the l-th signal path; $\mathbb{C}$ represents a complex set; $P_t$ and $Q_t$ represents the number of elements in a uniform plane array of the base station on the horizontal axis and the vertical axis respectively.

S103, calculating transmission directions of the pilot signal along different signal paths according to the CSI estimation value to obtain AoA (angle of arrival) estimation values.

Since the pilot signal can be transmitted along different signal paths, there will also be multiple transmission directions, and the multiple transmission directions correspond to multiple signal paths one by one.

Specifically, the AoA estimation algorithm can be used to calculate the transmission directions of the pilot signal along different signal paths.

In an example, the MUSIC (multiple signal classification) method is used to record the AoA estimation value of the l-th uplink signal path according to the CSI estimation value and AoA estimation value:

$$\hat{p}_{RX,l}^U = \left( \hat{\varphi}_l, \hat{\theta}_l \right),$$

65 wherein, $\hat{\varphi}_l$ is an azimuth angle of the l-th signal path and $\hat{\theta}_l$ is a pitch angle of the l-th signal path.

S104, performing directional beamforming based on the AoA estimation values to generate a spatially filtered CSI estimation value.

Specifically, performing beamforming in a direction indicated by the AoA estimation values to generate a beamforming vector in this direction, and then performing spatially filtering along this direction using the beamforming vector to generate a spatially filtered CSI estimation value.

In an example, the receiving beamforming vector of the l-th signal path in the $$\hat{p}_{RX,1}^U = (\hat{\varphi}_1, \hat{\theta}_1)$$

direction is calculated by using the least square method as follows:

$$w_{RX,l} = \frac{\left[a^H(\hat{p}_{RX,l}^U)\right]^\dagger}{\sqrt{\left\|\left[a^H(\hat{p}_{RX,l}^U)\right]^\dagger\right\|_2^2}},$$

wherein, H represents conjugate transposition operation;

$$a^H(\hat{p}_{RX,1}^U)$$

is conjugate transposition of $$a(\hat{p}_{RX,1}^U);$$

$[\cdot]^\dagger$ represents matrix pseudo-inverse operation;

$$\|\cdot\|_2^2$$

represents the square of the 1-2 norm of a vector.

The direction $$\hat{p}_{RX,1}^U = (\hat{\varphi}_1, \hat{\theta}_1)$$

is spatially filtered by $w_{RX,l}$ to generate a spatially filtered CSI estimation value of the l-th signal path on the n-th subcarrier of the m-th OFDM pilot symbol:

$$\hat{h}_{C,n,m}^l = (w_{RX,l})^H \hat{h}_{C,n,m} =$$

$$h_{C,n,m}^l + \bar{n}_{t,n,m}^l = \sqrt{P_t^U}\left[e^{j2\pi m T_s \tilde{f}_{d,l,m}} e^{-j2\pi n \Delta f \tilde{\tau}_{l,m}} b_{C,l} \chi_{TX,l} \chi_{RX,l}\right] + \bar{n}_{t,n,m}^l,$$

wherein, $$h_{C,n,m}^l$$

represents the true value of the spatially filtered CSI estimation value of the l-th signal path on the n-th subcarrier of the m-th OFDM pilot symbol;

$$\bar{n}_{t,n,m}^l$$

represents the spatially filtered noise term of the l-th signal path on the n-th subcarrier of the m-th OFDM pilot symbol; $\tilde{f}_{d,l,m}$ indicates the Doppler frequency offset when the l-th signal path contains CFO on the m-th OFDM pilot symbol, $\tilde{f}_{d,l,m} = f_{c,d,l} + \delta_f(m)$. $\tilde{\tau}_{l,m}$ is the time delay including TO of the m-th OFDM pilot symbol under the l-th signal path, $\tilde{\tau}_{l,m} = \tau_{c,l} + \delta_\tau(m)$; $\chi_{RX,l}$ represents the directional receiving gain of the l-th signal path, wherein $$X_{RX,1} = (w_{RX,1})^H a(p_{RX,1}^U).$$

S105, performing Kalman filtering on the spatially filtered CSI estimation value to generate an enhanced CSI estimation value.

In this solution, Kalman filter is used to suppress the time offset $\delta_\tau(m)$ which changes with time in the spatial filtered CSI estimation value, so as to suppress the distance offset caused by the time offset, thus improving the positioning accuracy.

The process of Kalman filtering can be specifically described in the embodiments of FIG. 3-1, FIG. 4-1 and FIG. 4-2 below.

S106: calculating transmission distances of the pilot signal transmitted along different signal paths according to the enhanced CSI estimation value to obtain distance estimation values.

Since the pilot signal can be transmitted along different signal paths, there will also be multiple transmission distances, and the multiple transmission distances correspond to multiple signal paths one by one.

Specifically, any distance estimation method based on CSI in the related art can be used to calculate the distance estimation value $\hat{r}_l$ of the l-th signal path.

S107: determining a position of the target UE according to a minimum distance estimation value among the distance estimation values and an AoA estimation value corresponding to the minimum distance estimation value.

Due to the fact that in all signal paths between the target UE and the base station, a path that has not been reflected by the scatterer is the path from the target UE directly to the base station, that is the LoS path. Because this path is not reflected by the scatterer, the distance thereof is the shortest among all signal paths. Therefore, the minimum distance $\hat{r}_0$ of the 0-th signal path among the distance estimation values is determined as the distance between the target UE and the base station, and the AoA estimation value $$\hat{p}_{RX,0}^U = (\hat{\varphi}_0, \hat{\theta}_0)$$

of the 0-th signal path corresponding to this minimum distance is determined as the direction of the target UE relative to the base station.

In the embodiment of the present invention, the base station directly calculates the position of the UE based on the pilot signal sent by the UE, without the need to send the UE positioning result through GPS, thereby avoiding the problem of UE positioning result deviation caused by changes in the UE position during the process of GPS sending the UE positioning result to the base station, and improving the accuracy of UE positioning.

In addition, due to the possibility of clock asynchrony between the base station and the UE when positioning the UE based on the pilot signal sent by the UE, the pilot signal received by the base station may have a time offset due to the influence of clock asynchrony. Therefore, conducting UE positioning on this basis can easily cause distance offset in positioning. In the embodiment of the present invention, by performing Kalman filtering on the spatially filtered CSI estimation value, the distance offset caused by the time offset in the spatially filtered CSI estimation value can be suppressed, so that the UE can be positioned based on the enhanced CSI estimation value which is less affected by the time offset, thereby making the determined position of the UE more accurate.

In an embodiment of the present invention, refer to FIG. 3-1, which is a schematic flowchart of a second user equipment positioning method provided by an embodiment of the present invention. Step S105 in FIG. 1 can be realized through the following steps S1051-S1054.

S1051, calculating a Doppler frequency shift estimation value and a noise variance estimation value according to the spatial filtered CSI estimation value.

When the total number of subcarriers is Ne, and the total number of OFDM pilot symbols is $M_s$, the spatially filtered CSI estimation values of $M_s$ OFDM pilot symbols of $N_c$ subcarriers are stacked to generate a stacked CSI matrix estimation value $$\hat{H}_C^1$$

of the l-th signal path with the stacked dimension $N_c{\times}M_s$, wherein the stacked CSI matrix estimation value of the m-th OFDM pilot symbol of the n-th subcarrier contained in $$\hat{H}_C^1$$

is $[\hat{H}_C^1]_{n,m} = \hat{h}_{C,n,m}^1$.

The corresponding true value of $$\hat{H}_C^1$$

is recorded as $$H_C^1,$$

and the true value of the stacked CSI matrix estimation value of the m-th OFDM pilot symbol containing the n-th subcarrier on the l-th signal path in $$H_C^1$$

is recorded as the (n,m)-th $$H_C^1,$$

which can be expressed as:

$$[H_C^l]_{n,m} = \sqrt{P_t^U} \, b_{C,l} \chi_{RX,l} \chi_{TX,l} e^{-j2\pi n\Delta f \tau_{l,m}} e^{j2\pi m T_s \bar{f}_{d,l,m}},$$

$$\text{wherein } [H_C^l]_{n,m} = h_{C,n,m}^l.$$

wherein $$[H_C^1]_{n,m} = h_{C,n,m}^1.$$

In an example, the Doppler frequency shift estimation value and noise variance estimation value are calculated according to $$\hat{H}_C^1,$$

refer to FIG. 3-2, which is a schematic flowchart of calculating a Doppler frequency shift estimation value and a noise variance estimation value provided by the embodiment of the present invention. After performing autocorrelation matrix operation on $$\hat{H}_C^1,$$

the obtained autocorrelation matrix $R_f$ of $$\hat{H}_C^l$$

can be expressed as:

$$R_f = (\hat{H}_C^l)^T (\hat{H}_C^l)^*,$$

wherein, f represents a variable related to Doppler frequency shift, $(\cdot)^T$ represents matrix transposition operation; $(\cdot)^*$ represents a conjugate operation.

By eigenvalue decomposition on $R_f$, it can be obtained that:

$$\left[ U_f, \sum{}_f \right] = eig(R_f),$$

wherein, $\Sigma_f$ represents an eigenvalue matrix, which is a diagonal matrix formed by the descending arrangement of eigenvalue elements of $$\hat{H}_C^l;$$

$U^f$ representing an eigen matrix, which is a matrix composed of eigen vectors corresponding to eigenvalues in $\Sigma_f$, the dimension of $U_f$ is $M_s{\times}M_s$; eig( ) is the function for finding eigenvalues.

The estimated value of the number of eigenvalues of $\Sigma_f$ is recorded as $L_N$, and the matrix composed of the last $L_N$ columns in $U_f$ is null space base $U_{fN}$, $$U_{fN} = [U_f]_{:,M_s-L_N+1:M_s},$$

wherein fN represents the noise subspace variable in the process of solving Doppler frequency shift.

A Doppler spatial spectrum function $$f_f^D(f)$$

is constructed by using a null space base $U_{fN}$, $$f_f^D(f) = \left\| (U_{fN})^H a_f(f) \right\|_2^2,$$

wherein, D and f represent parameters used in solving the Doppler frequency shift; $a_f(f)$ represents the Doppler steering vector constructed when the Doppler value is f, wherein the dimension of $a_f(f)$ is $M_s \times 1$ and the m-th element is $[a_f(f)]_m = e^{j2\pi mT_s\tilde{f}_{d,l,m}}$; the minimum point of Doppler spatial spectral function is the Doppler frequency shift estimation value $\tilde{f}_{d,1,m}$ of the m-th OFDM pilot symbol on the l-th signal path.

The noise variance estimation value in $$\hat{H}_C^l$$

is calculated as:

$$\hat{\sigma}_N^2 = \frac{\sum_{i=L_N+1}^{M_s} [\sum_f]_{i,i}}{M_s - L_N},$$

wherein, $$\hat{\sigma}_N^2$$

represents the noise variance estimation value, and N represents the key variable related to noise subspace in the process of solving noise variance; i represents the index value of the accumulation operation.

In addition, the Doppler shift estimation value and the noise variance estimation value can be calculated by any method that can estimate the Doppler and noise variance. Moreover, because the MUSIC method supports the estimation of both noise variance estimation value and Doppler frequency shift estimation value. Therefore, for convenience, MUSIC method can be used to estimate Doppler frequency shift estimation value and noise variance estimation value.

S1052, generating a state transition coefficient according to the Doppler frequency shift estimation value.

For example, according to the Doppler frequency shift estimation value $\tilde{f}_{d,l,m}$, a state transition coefficient of the l-th signal path is generated:

$$A_{s,l} = e^{j2\pi T_s \tilde{f}_{d,l,m}},$$

wherein s in $A_{s,l}$ represents the key variable related to sensing in the process of solving the state transition coefficient.

S1053, generating a state transition equation according to the state transition coefficient.

The row vector $$[H_c^1]_n, :$$

composed based on the n-th row of $$H_C^l$$

can be regarded as a state transition with m as the independent variable, so that the state transition equation can be generated according to the state transition coefficient $A_{s,l}$:

$$[H_C^l]_{n,m+1} = [H_C^l]_{n,m} A_{s,l},$$

wherein, $$[H_C^l]_{n,m+1}$$

represents the true value corresponding to the stacked CSI matrix estimation value of the m+1th OFDM pilot symbol of the n-th subcarrier on the l-th signal path.

S1054, performing Kalman filtering on the spatially filtered CSI estimation value according to the state transition equation and the noise variance estimation value to generate the enhanced CSI estimation value.

Because $$\hat{H}_C^1$$

is a noisy observation of $$H_C^1,$$

it is necessary to denoise $$\hat{H}_C^1$$

if it is wanted to get more accurate CSI estimation value.

Specifically, based on the noise variance estimation value $$\hat{\sigma}_N^2$$

that has been calculated as mentioned above, each row in $$\hat{H}_C^l$$

can be filtered by Kalman filter to suppress the time shift $\delta_\tau(m)$ in each row in $$\hat{H}_C^l$$

which changes with time, so as to suppress the distance shift caused by the time shift and generate a more accurate enhanced CSI estimation value of the l-th signal path, which is recorded as $$\hat{H}_C^{l,(1)},$$

wherein (1) represents the corresponding enhanced CSI estimation value. The process of Kalman filtering for each row can refer to the embodiment shown in FIG. 4-1, and will not be repeated here.

In the embodiment of the present invention, the Doppler frequency shift estimation value and the noise variance estimation value are calculated according to the spatial filtered CSI estimation value, and the state transition coefficient is generated by using the Doppler frequency shift estimation value, so that the state transition equation is generated, which provides a foundation for subsequent Kalman filtering based on the state transition equation and the noise variance estimation value and ensures that the Kalman filtering process can be performed normally.

In an embodiment of the present invention, please refer to FIG. 4-1, which is a schematic flowchart of a third user equipment positioning method provided by an embodiment of the present invention. Step S105 in FIG. 1 can be realized through the following steps S105A-S105B.

S105A, performing the Kalman filtering on individual elements in the spatial filtered CSI estimation value from front to back, to generate a positive order filtering result.

In example 1, there are P elements in each row of a certain spatially filtered CSI estimation value, that is, the dimension of each row of the spatially filtered CSI estimation value is P. According to the order from the first element to the tenth element, the 10 elements in each row of the spatial filtered CSI estimation value are sequentially subjected to Kalman filtering, wherein the Kalman filtering for other elements except for the first element is based on the result obtained after Kalman filtering of the previous element, and finally a positive order filtering result with dimension P is generated. In the present invention, the process of generating positive order filtering result is called positive order Kalman filtering.

S105B, performing the Kalman filtering on individual elements in the positive order filtering result from back to front, to generate the enhanced CSI estimation value.

Corresponding to the above example 1, the positive order filtering result with dimension P is subjected to Kalman filtering in the order from the 10th element to the 1st element, wherein the Kalman filtering for other elements except for the first element is based on the result obtained after Kalman filtering of the previous element, and finally the enhanced CSI estimation values are generated. In the present invention, the process of generating the enhanced CSI estimation values from back to front is called reverse order Kalman filtering.

In the related art, Kalman filtering is usually performed only once, that is, the filtering is completed only once for each element based on a certain order, which will make the element in the later processing order get more accurate filtering results. However, the filtering results are not accurate enough for the previously processed elements. In the embodiment of the present invention, after performing Kalman filtering on the elements in the spatially filtered CSI estimation value sequentially according to the order from front to back to generate a positive order filtering result, Kalman filtering is performed on the elements sequentially according to the order from back to front to generate the enhanced CSI estimation values, so that each element is filtered twice, and the second filtering is performed according to the order from back to front, so that the elements processed previously in the first filtering are in the later-processing position in the second filtering, and the accuracy after processing is improved, resulting in a more accurate result of Kalman filtering for each element in the CSI estimation values after spatial filtering.

The process of FIG. 4-1 will be explained in detail with a specific example. Please refer to FIG. 4-2, which is a schematic flowchart of Kalman filtering provided by an embodiment of the present invention. Step S105A-S105B in FIG. 4-1 can be realized through the following steps S401-S405.

S401, obtaining a spatially filtered CSI estimation value, a Doppler frequency shift estimation value and a noise variance estimation value.

For the calculation methods of the spatial filtered CSI estimation value, Doppler frequency shift estimation value and noise variance estimation value, please refer to the above description.

In an example 2, a row vector $$\left[\hat{H}_C^1\right]_n;$$

composed of the n-th row of $$\hat{H}_C^1$$

obtained by processing the n, spatial filtered CSI estimation value can be obtained, and recorded as $\hat{h}_c$, and the Doppler frequency shift estimation value $\tilde{f}_{d,l,m}$ and the noise variance estimation value $\hat{\sigma}_N^2$ can be obtained. In this embodiment, only the process of Kalman filtering for the row vector composed of the n-th row is described. In fact, the same processing is required for each row in $$\hat{H}_C^1,$$

only for different numbers of rows. In fact, the same processing is required for each row in $$\hat{H}_C^l,$$

only for different numbers of rows.

S402, constructing a state transition coefficient according to the Doppler frequency shift estimation value.

Corresponding to the above example 2, the state transition coefficient is generated according to the Doppler frequency shift estimation value $\tilde{f}_{d,l,m}$:

$$A_{s,l} = e^{j2\pi T_s \tilde{f}_{d,l,m}}.$$

S403, generating a state transition equation according to the state transition coefficient.

Corresponding to example 2 above, according to the state transition coefficient $A_{s,l}$, the state transition equation is generated:

$$[\hat{h}_C]_{m+1} = [\hat{h}_C]_m A_{s,l} + n_m,$$

wherein, $[\hat{h}_C]_{m+1}$ represents the (m+1)-th element of the vector $\hat{h}_C$; $n_m$ represents the m-th element of the vector $\hat{h}_C$; $n_m$ represents the error term of the m-th element.

After the state transition equation is generated, the dimension of $\hat{h}_C$ is recorded, assuming that the recorded dimension is P, the initial value of variance of CSI estimation value can be estimated as follows:

$$P_{w,0} = \frac{\sum_{p=0}^{P-1}\left\|[\hat{h}_C]_p(A_{s,l})^{-p} - [\hat{h}_C]_0\right\|_2^2}{P},$$

wherein, w represents a variable related to noise, $P_{w,0}$ represents the initial variance value of CSI estimation value, $[\hat{h}^C]_p$ represents an element with index number p of the vector $\hat{h}_C$ and $[\hat{h}^C]_0$ represents an element with index number 0 of the vector $\hat{h}_C$.

S404, performing a positive order Kalman filtering on the spatially filtered CSI estimation value based on the state transition equation and the noise variance estimation value to generate a positive order filtering result.

Specifically, positive order Kalman filtering can be performed on P elements in each row of the spatial filtered CSI estimation value to generate the positive order filtering result. Specifically, in the process of performing positive order Kalman filtering, a prior estimation value, a prior estimation value variance, an estimation weighting coefficient, a posterior estimation value and a posterior estimation value variance of each element can be calculated.

The recursive expression of the prior estimation value is:

$$[\hat{h}_C]_p^- = A_{s,l}[\bar{h}_C]_{p-1},$$

wherein, $$[\hat{h}_C]_p^-$$

represents the prior CSI estimation value of the p-th element, $\bar{h}_C$ represents a new vector composed of the posterior CSI estimation value after Kalman filtering, and $[\bar{h}_C]_{p-1}$ help-s represents the (p−1)-th element in $\bar{h}_C$.

The recursive expression of the prior estimation value variance is:

$$P_{w,p}^- = A_{s,l}P_{w,p-1}A_{s,l}^*,$$

wherein, $$P_{w,p}^-$$

represents the prior estimation value variance of the p-th element and $P_{w,p-1}$ represents the posterior estimation value variance of the (p−1)-th element.

The expression of the estimation weighting coefficient is:

$$K = \left(P_{w,p}^-\right)^* \left(P_{w,p}^- + \hat{\sigma}_N^2\right)^{-1},$$

wherein, K represents the estimation weighting coefficient.

The expression of the posterior estimation value is:

$$[\bar{h}_C]_p = [\hat{h}_C]_p^- + K([\hat{h}_C]_p - [\hat{h}_C]_p^-),$$

wherein, $[\bar{h}_C]_p$ help represents the posterior estimation value corresponding to the p-th element in $\bar{h}_C$.

The expression of the posterior estimation value variance is:

$$P_{w,p} = (1 - K_k)P_{w,p}^-,$$

wherein, $P_{w,p}$ represents the posterior estimation value variance of the p-th element.

S405, performing a reverse order Kalman filtering based on the positive order filtering result to generate the enhanced CSI estimation value.

Specifically, a reverse order Kalman filtering can be performed on P elements in each row of the positive order filtering result to generate the enhanced CSI estimation value. Specifically, in the process of performing reverse order Kalman filtering, a prior estimation value, a prior estimation value variance, an estimation weighting coefficient, a posterior estimation value and a posterior estimation value variance of each element can be calculated.

The expression of the prior estimation value is:

$$[\hat{h}_C]^-_{p-1} = A_{s,l}^{-1}[\overline{h}_C]_p,$$

wherein, $$[\hat{h}_C]^-_{p-1}$$

represents the prior CSI estimation value of the (p−1)-th element.

The expression of the prior estimation value variance is:

$$P^-_{w,p-1} = A_{s,l}^{-1}P_{w,p}(A_{s,l}^{-1})^*,$$

wherein, $$P^-_{w,p-1}$$

represents the prior estimation value variance of the (p−1)-th element.

The expression of the estimation weighting coefficient is:

$$K = (P^-_{w,p-1})^*(P^-_{w,p-1} + \hat{\sigma}^2_N)^{-1}.$$

The expression of the posterior estimation value is:

$$[\overline{h}_C]_{p-1} = [\hat{h}_C]^-_{p-1} + K_k([\hat{h}_C]_{p-1} - [\hat{h}_C]^-_{p-1}),$$

wherein, $[\overline{h}_C]_{p-1}$ represents the posterior estimation value corresponding to the (p−1)-th element in $\overline{h}_C$.

The expression of the posterior estimation value variance is:

$$P_{w,p-1} = (1 - K_k)P^-_{w,p-1},$$

wherein, $P_{w,p-1}$ represents the posterior estimation value variance of the (p−1)-th element.

In an embodiment of the present invention, refer to FIG. 5-1, which is a schematic flowchart of a fourth user equipment positioning method provided by an embodiment of the present invention. On the basis of the embodiment of FIG. 1, the above method may further include step S108.

S108: determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point.

The scattering distance estimation value is: a distance estimation value other than the minimum distance estimation value.

Since the minimum distance among the distance estimation values is the distance from the target UE to the base station directly without being reflected by the scatterer, the distance estimation value other than the minimum distance is the distance from the target UE to the base station through the scatterer, that is, the sum of the distance from the target UE to the scatterer and the distance from the scatterer to the base station, which is called the scattering distance estimation value here.

For one example, refer to FIG. 5-2, which is a schematic flowchart of determining the position of a scatterer by using an ellipsoid according to an embodiment of the present invention. As shown in FIG. 5-2, the target ellipsoid is constructed with the position of target UE and the position of base station as the focus and the scattering distance estimation value as the length of the long axis (corresponding to the solid line in the Figure), and the intersection in the direction relative to the base station (corresponding to the dotted line direction in the figure) of the AoA estimation value corresponding to the scattering distance estimation value and the target ellipsoid is determined, and then the position of the intersection is taken as the position of the scatterer.

Of course, the position of the scatterer can also be determined by other position determination methods, and the method of determining the position of the scatterer is not limited here.

In the embodiment of the present invention, the position of the scatterer can be determined according to the scattering distance estimation value and the AoA estimation value corresponding to the scattering distance estimation value, by taking the position of the target UE and the position of the base station as a basis point. Because the solution provided by the embodiment of the present invention can accurately estimate the distance between the target UE and the base station, the positions of various scatterers around the target UE can be accurately estimated on this basis, thereby determining the surrounding environment of the target UE.

In an example, refer to FIG. 6, which is a schematic flowchart of determining the position of a target UE and the position of a scatterer provided by an embodiment of the present invention. The process of determining the position of the scatterer can refer to the following steps S601-S606.

S601, obtaining the AoA estimation value and the distance estimation value in the world coordinate system.

Specifically, the way to convert the AoA estimation value and the distance estimation value into the world coordinate system can be found in related art.

S602, estimating a position of the target UE.

The specific process can be described in step S107 above.

S603, establishing a local Cartesian coordinate system with a direction from the base station to the target UE as an X axis, and calculating the rotation angle between the world coordinate system and the local Cartesian coordinate system.

For the realization of the above process, please refer to related art.

S604: calculating an angle of the AoA estimation value in the local Cartesian coordinate system based on the rotation angle to generate a local AoA estimation value of the scatterer.

Specifically, the angle of each AoA estimation value of $$\hat{p}_{RX,1}^{U}$$

with $$\hat{p}_{RX,0}^{U}$$

removed in the local Cartesian coordinate system is calculated to generate the local AoA estimation value of the scatterer.

S605: determining coordinates of the scatterer in the local Cartesian coordinate system and generating local coordinates of the scatterer according to the local AoA estimation value and the distance estimation value.

S606: rotating linearly the local coordinates of the scatterer to generate coordinates of the scatterer in the world coordinate system.

The coordinates of the scatterer in the world coordinate system are the position of the scatterer in the world coordinate system.

An embodiment of the present invention provides a user equipment positioning apparatus, applied to a base station. Please refer to FIG. 7, which is a schematic diagram of the structure of the user equipment positioning apparatus provided by an embodiment of the present invention. The above apparatus includes:

a signal receiving module 701, configured for receiving a pilot signal sent by a target UE;

a channel estimation module 702, configured for calculating a CSI estimation value of a channel between the base station and the target UE according to the received pilot signal;

an angle estimation module 703, configured for calculating transmission directions of the pilot signal along different signal paths according to the CSI estimation value to obtain AoA estimation values;

a spatial filtering module 704, configured for performing directional beamforming based on the AoA estimation values to generate a spatially filtered CSI estimation value;

a Kalman filtering module 705, configured for performing Kalman filtering on the spatially filtered CSI estimation value to generate an enhanced CSI estimation value;

a distance estimation module 706, configured for calculating transmission distances of the pilot signal transmitted along different signal paths according to the enhanced CSI estimation value to obtain distance estimation values;

a position determination module 707, configured for determining a position of the target UE according to a minimum distance estimation value among the distance estimation values and an AoA estimation value corresponding to the minimum distance estimation value.

In the embodiment of the present invention, the position of the UE is directly calculated by the base station according to the pilot signal sent by the UE, without the need to send positioning results of the UE through GPS, this avoids the problem of deviation of the positioning results of the UE caused by the change of the position of the UE in the process of GPS sending the UE positioning results to the base station, thus improving the accuracy of the positioning of the UE.

In one embodiment of the present invention, the Kalman filtering module 705 includes:

a positive order filtering submodule, configured for performing the Kalman filtering on individual elements in the spatial filtered CSI estimation value from front to back, to generate a positive order filtering result;

a reverse order filtering submodule, configured for performing the Kalman filtering on individual elements in the positive order filtering result from back to front, to generate the enhanced CSI estimation value.

In the embodiment of the present invention, after performing Kalman filtering on the elements in the spatially filtered CSI estimation value sequentially according to the order from front to back to generate a positive order filtering result, Kalman filtering is performed on the elements sequentially according to the order from back to front to generate an enhanced CSI estimation value, so that each element is filtered twice, and the second filtering is performed according to the order from back to front, so that the elements processed previously in the first filtering are in the later-processing position in the second filtering, and the accuracy after processing is improved, thereby the results of Kalman filtering for each element in the spatial filtered CSI estimation value being more accurate.

In one embodiment of the present invention, the Kalman filtering module 705 includes:

an estimation value calculation submodule, configured for calculating a Doppler frequency shift estimation value and a noise variance estimation value according to the spatial filtered CSI estimation value;

a coefficient generating submodule, configured for generating a state transition coefficient according to the Doppler frequency shift estimation value;

an equation generation submodule, configured for generating a state transition equation according to the state transition coefficient;

a Kalman filtering submodule, configured for performing the Kalman filtering on the spatially filtered CSI estimation value according to the state transition equation and the noise variance estimation value to generate the enhanced CSI estimation value.

In the embodiment of the present invention, the Doppler frequency shift estimation value and the noise variance estimation value are calculated according to the spatial filtered CSI estimation value, and the state transition coefficient is generated by using the Doppler frequency shift estimation value, so that the state transition equation is generated, which provides a foundation for subsequent Kalman filtering based on the state transition equation and the noise variance estimation value and ensures that the Kalman filtering process can be performed normally.

In one embodiment of the present invention, the apparatus further includes:

a scatterer position determination module, configured for determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point; wherein the scattering distance estimation value is a distance estimation value other than the minimum distance estimation value.

In the embodiment of the present invention, the position of the scatterer can be determined according to the scattering distance estimation value and the AoA estimation value corresponding to the scattering distance estimation value, by taking the position of the target UE and the position of the base station as a basis point. Because the solution provided by the embodiment of the present invention can accurately estimate the distance between the target UE and the base station, the positions of scatterers around the target UE can be accurately estimated on this basis, thereby determining the surrounding environment of the target UE.

The embodiment of the present invention also provides a base station, as shown in FIG. 8, which is a schematic diagram of the structure of the base station provided by the embodiment of the present invention, which comprises a processor 801, a communication interface 802, a memory 803 and a communication bus 804, wherein the processor 801, the communication interface 802 and the memory 803 communicate with each other through the communication bus 804, the memory 803 is to store a computer program;

the processor 801 is to implement any of the above user equipment positioning methods when executing the program stored in the memory 803.

When the base station provided by the embodiment of the present invention is used for positioning the user equipment, the position of the UE is directly calculated by the base station according to the pilot signal sent by the UE, without the need to send positioning results of the UE through GPS, this avoids the problem of deviation of the positioning results of the UE caused by the change of the position of the UE in the process of GPS sending the UE positioning results to the base station, thus improving the accuracy of the positioning of the UE.

The communication bus mentioned by the above-mentioned base station can be a peripheral component interconnect (PCI) bus or an extended industry standard architecture (EISA) bus. The communication bus can be classified into address bus, data bus and control bus. For the convenience of representation, the communication in the figure is only represented by a thick line, but it does not mean that there is only one bus or one type of bus.

The communication interface is used for communication between the above-mentioned base station and other devices.

The memory may comprise Random Access Memory (RAM) or Non-Volatile Memory (NVM), such as at least one disk memory. Optionally, the memory can also be at least one storage apparatus located far away from the aforementioned processor.

The processor can be a general processor, comprising a Central Processing Unit (CPU) and a Network Processor (NP). It can also be a Digital Signal Processor (DSP), an application specific integrated circuit (ASIC), a Field-Programmable Gate Array (FPGA) or other programmable logical means, discrete gate or transistor logical means and discrete hardware components.

In another embodiment provided by the present invention, a computer-readable storage medium is also provided, in which a computer program is stored which, when executed by a processor, realizes any one of steps of the above user equipment positioning methods.

When the computer program stored in the computer-readable storage medium provided by the embodiment of the present invention is used for positioning the user equipment, the position of the UE is directly calculated by the base station according to the pilot signal sent by the UE, and the positioning result of the UE does not need to be sent by GPS, so that the problem of deviation of the positioning result of the UE caused by the change of the position of the UE in the process of sending the positioning result of the UE to the base station by GPS is avoided, and the accuracy of the positioning of the UE is improved.

In yet another embodiment provided by the present invention, a computer program product is also provided which contains instructions which, when run on a computer, cause the computer to perform any one of the above user equipment positioning methods in the above embodiment.

When the computer program product provided by the embodiment of the present invention is used for positioning the user equipment, the position of the UE is directly calculated by the base station according to the pilot signal sent by the UE, and the positioning result of the UE does not need to be sent by GPS, so that the problem of deviation of the positioning result of the UE caused by the change of the position of the UE in the process of sending the positioning result of the UE to the base station by GPS is avoided, and the accuracy of the positioning of the UE is improved.

In the above embodiments, it can be realized in whole or in part by software, hardware, firmware or any combination thereof. When implemented in software, it can be fully or partially implemented in the form of a computer program product. The computer program product comprises one or more computer instructions. When the computer program instruction is loaded and executed on a computer, the process or function described in the embodiment of the present invention is generated in whole or in part. The computer can be a general-purpose computer, a special-purpose computer, a computer network, or other programmable apparatuses. The computer instruction can be stored in a computer-readable storage medium or transmitted from one computer-readable storage medium to another. For example, the computer instruction can be transmitted from one website, computer, server or data center to another website, computer, server or data center by wired (such as coaxial cable, optical fiber, digital subscriber line (DSL)) or wireless (such as infrared, wireless, microwave, etc.). The computer-readable storage medium can be any available medium that a computer can access or a data storage device such as a server, a data center and the like that contains one or more available medium. The available medium may be a magnetic medium (e.g., floppy disk, hard disk, magnetic tape), an optical medium (e.g., DVD), or a semiconductor medium (e.g., Solid State Disk (SSD)) and the like.

It should be noted that in this paper, relational terms such as first and second are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or equipment comprising a series of elements comprises not only those elements, but also other elements not explicitly listed or elements inherent to such process, method, article or device. Without further restrictions, an element defined by the phrase "comprising a/an . . . " does not exclude the existence of other identical elements in the process, method, article or device comprising the element.

Each embodiment in this specification is described in a related way, and only the same and similar parts between the embodiments can be referred to each other, and each embodiment focuses on the differences from other embodiments. Especially, for the embodiment of the apparatus, the base station, the computer program product and the computer-readable storage medium, because it is basically similar to the embodiment of the method, the description is relatively simple, and the relevant points can only be found in part of the description of the embodiment of the method.

The above is only the preferred embodiment of the present invention, and is not used to limit the protection scope of the present invention. Any modification, equivalent substitution, improvement, etc. made within the spirit and principle of the invention should be comprised in the scope of protection of the invention.

What is claimed is:

1. A user equipment positioning method, applied to a base station, wherein the method comprises:

receiving a pilot signal sent by a target user equipment, UE;

calculating a channel state information, CSI, estimation value of a channel between the base station and the target UE according to the received pilot signal;

calculating transmission directions of the pilot signal along different signal paths according to the CSI estimation value to obtain angle of arrival, AoA, estimation values;

performing directional beamforming based on the AoA estimation values to generate a spatially filtered CSI estimation value;

performing Kalman filtering on the spatially filtered CSI estimation value to generate an enhanced CSI estimation value;

calculating transmission distances of the pilot signal transmitted along different signal paths according to the enhanced CSI estimation value to obtain distance estimation values;

determining a position of the target UE according to a minimum distance estimation value among the distance estimation values and an AoA estimation value corresponding to the minimum distance estimation value.

2. The method according to claim 1, wherein the performing Kalman filtering on the spatially filtered CSI estimation value to generate an enhanced CSI estimation value, comprises:

performing the Kalman filtering on individual elements in the spatial filtered CSI estimation value from front to back, to generate a positive order filtering result;

performing the Kalman filtering on individual elements in the positive order filtering result from back to front, to generate the enhanced CSI estimation value.

3. The method according to claim 1, wherein the performing Kalman filtering on the spatially filtered CSI estimation value to generate an enhanced CSI estimation value, comprises:

calculating a Doppler frequency shift estimation value and a noise variance estimation value according to the spatial filtered CSI estimation value;

generating a state transition coefficient according to the Doppler frequency shift estimation value;

generating a state transition equation according to the state transition coefficient;

performing the Kalman filtering on the spatially filtered CSI estimation value according to the state transition equation and the noise variance estimation value to generate the enhanced CSI estimation value.

4. The method according to claim 1, wherein the method further comprises:

determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

5. The method according to claim 2, wherein the method further comprises:

determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point; wherein, the scattering distance estimation value is: a distance estimation value other than the minimum distance estimation value.

6. The method according to claim 3, wherein the method further comprises:

determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point; wherein, the scattering distance estimation value is: a distance estimation value other than the minimum distance estimation value.

7. A user equipment positioning apparatus, applied to a base station, wherein the apparatus comprises:

a signal receiving module, configured for receiving a pilot signal sent by a target user equipment, UE;

a channel estimation module, configured for calculating a channel state information, CSI, estimation value of a channel between the base station and the target UE according to the received pilot signal;

an angle estimation module, configured for calculating transmission directions of the pilot signal along different signal paths according to the CSI estimation value to obtain angle of arrival, AoA, estimation values;

a spatial filtering module, configured for performing directional beamforming based on the AoA estimation values to generate a spatially filtered CSI estimation value;

a Kalman filtering module, configured for performing Kalman filtering on the spatially filtered CSI estimation value to generate an enhanced CSI estimation value;

a distance estimation module, configured for calculating transmission distances of the pilot signal transmitted along different signal paths according to the enhanced CSI estimation value to obtain distance estimation values;

a position determination module, configured for determining a position of the target UE according to a minimum distance estimation value among the distance estimation values and an AoA estimation value corresponding to the minimum distance estimation value.

8. The apparatus according to claim 7, wherein the Kalman filtering module comprises:

a positive order filtering submodule, configured for performing the Kalman filtering on individual elements in the spatial filtered CSI estimation value from front to back, to generate a positive order filtering result;

a reverse order filtering submodule, configured for performing the Kalman filtering on individual elements in the positive order filtering result from back to front, to generate the enhanced CSI estimation value.

9. The apparatus according to claim 7, wherein the Kalman filtering module comprises:

an estimation value calculation submodule, configured for calculating a Doppler frequency shift estimation value and a noise variance estimation value according to the spatial filtered CSI estimation value;

a coefficient generating submodule, configured for generating a state transition coefficient according to the Doppler frequency shift estimation value;

an equation generation submodule, configured for generating a state transition equation according to the state transition coefficient;

a Kalman filtering submodule, configured for performing the Kalman filtering on the spatially filtered CSI estimation value according to the state transition equation and the noise variance estimation value to generate the enhanced CSI estimation value.

10. The apparatus according to claim 7, wherein the apparatus further comprises:

a scatterer position determination module, configured for determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

11. The apparatus according to claim 8, wherein the apparatus further comprises:

a scatterer position determination module, configured for determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

12. The apparatus according to claim 9, wherein the apparatus further comprises:

a scatterer position determination module, configured for determining a position of a scatterer in a signal transmission path corresponding to a scattering distance estimation value according to the scattering distance estimation value and an AoA estimation value corresponding to the scattering distance estimation value, by taking the position of the target UE and the position of the base station as a basis point;

wherein, the scattering distance estimation value is: a distance estimation value other than the minimum distance estimation value.

13. A base station comprising a processor, a communication interface, a memory and a communication bus, wherein the processor, the communication interface and the memory communicate with each other through the communication bus; wherein the memory is to store a computer program;

the processor, when executing the program stored in the memory, carries out the method of claim 1.

14. A non-transitory computer-readable storage medium having a computer program stored thereon which, when executed by a processor, carry out the method of claim 1.

* * * * *